Oct. 11, 1938.  G. L. KYLE  2,132,793
STORAGE BATTERY CONSTRUCTION
Filed June 13, 1934  3 Sheets-Sheet 1

INVENTOR
GEORGE L. KYLE
BY
ATTORNEY

Oct. 11, 1938.  G. L. KYLE  2,132,793

STORAGE BATTERY CONSTRUCTION

Filed June 13, 1934  3 Sheets-Sheet 2

INVENTOR.
GEORGE L. KYLE
BY
ATTORNEY

Oct. 11, 1938.  G. L. KYLE  2,132,793

STORAGE BATTERY CONSTRUCTION

Filed June 13, 1934  3 Sheets-Sheet 3

INVENTOR.
GEORGE L. KYLE
BY
ATTORNEY

Patented Oct. 11, 1938

2,132,793

UNITED STATES PATENT OFFICE 2,132,793

STORAGE BATTERY CONSTRUCTION

George L. Kyle, Niagara Falls, N. Y., assignor to USL Battery Corporation, Niagara Falls, N. Y., a corporation of New York Application June 13, 1934, Serial No. 730,393

4 Claims. (Cl. 136—135)

This invention relates to electric batteries and more particularly to a battery case having integral intercell and terminal connectors.

One of the objects of the present invention is to provide a storage battery in which no connecting elements extend above the top surface of the battery.

Another object of the present invention is to provide novel terminal and intercell connectors which are formed as an integral part of the battery casing.

Another object of the present invention is to provide a novel arrangement of terminal connectors in a battery case which decreases the corrosion of the connectors and completes the external circuit connection on the outside of the casing instead of on the top, as in the usual manner.

Another object of the present invention is to provide a terminal connector having a novel construction for facilitating connections with a bus bar or cable terminal of an external circuit.

Still another object of the present invention is to provide a battery case having integral intercell and terminal connectors that is easily and economically manufactured, neat and compact in appearance, and practical and efficient in its intended use.

These and other objects will appear from the following description and drawings, in which like reference characters denote like parts throughout the several views, but it is to be expressly understood that the drawings are for purposes of illustration only and not a definition of the limits of the invention, reference being had for this purpose to the appended claims.

In the drawings:—

Heretofore, in the usual practice, the lugs of the plate straps extend upwardly through the top of the casing and are connected externally by lead straps. In these constructions, the terminal binding posts also extend upwardly above the top of the casing and all within the confines of the inside of the walls of the casing. Because of the proximity of the binding posts and connecting straps to the vent plugs of the cells, considerable corrosion takes place beside leakage and short circuits due to the limited space on the top of the battery and the collection of deposits between the metallic elements. In accordance with the present invention, all connections are made either below the top surface of the battery or on the outside of the walls of the battery casing so that the top surface of the battery has only vent plugs and no connecting straps nor binding posts. It will be seen from such a construction that the possibility of leakage or short circuits is substantially eliminated, as is also corrosion of the terminal connectors.

Figure 1:
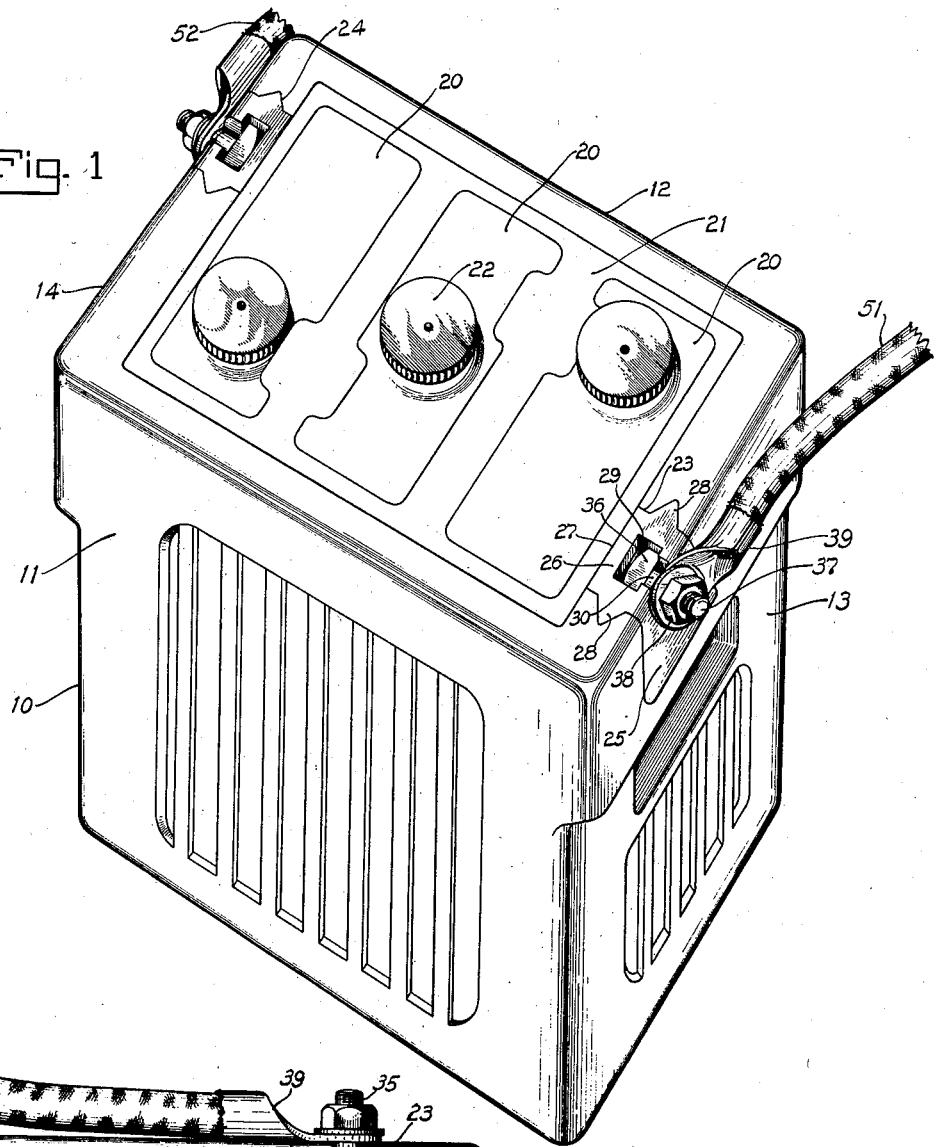
Figure 1 is a perspective view of a storage battery showing the novel terminal connectors in their relation to the battery case and their connection with the cables of an external circuit.
Figure 2:
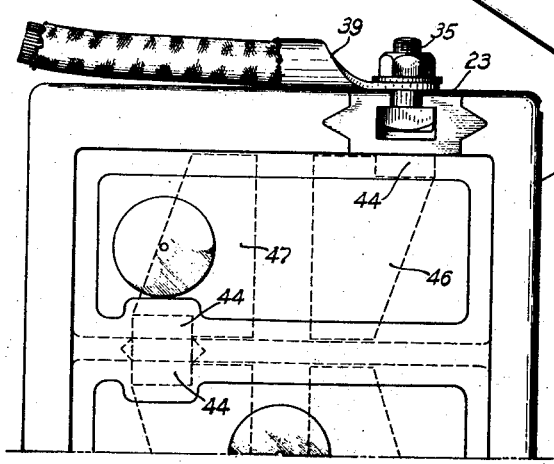
Figure 2 is a top plan view of the lower half of the battery shown in Figure 1.
Figure 3:
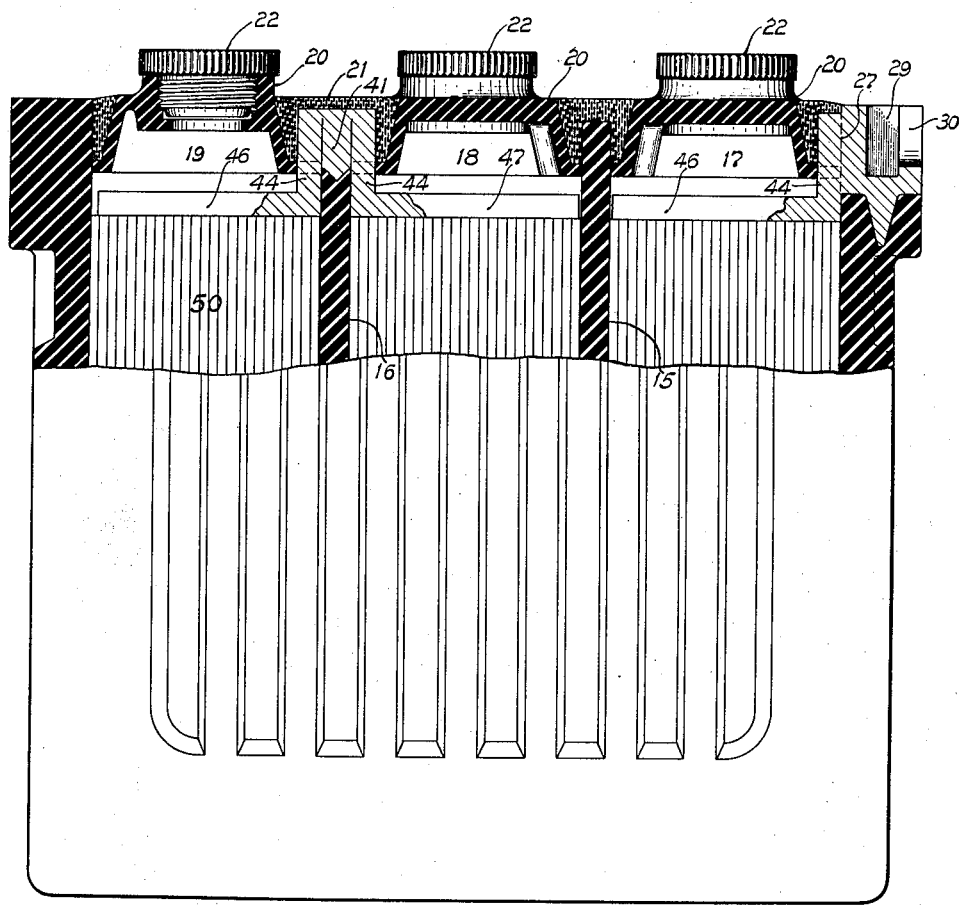
Figure 3 is a side elevational view partly in section of the battery shown in Figure 1.
Figure 4:
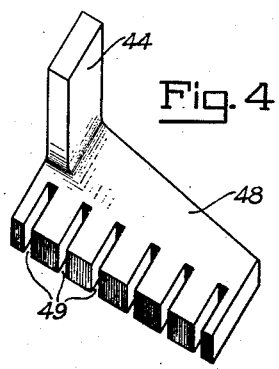
Figure 4 is a perspective view of the plate separating and connector strap of Figure 3.
Figure 5:
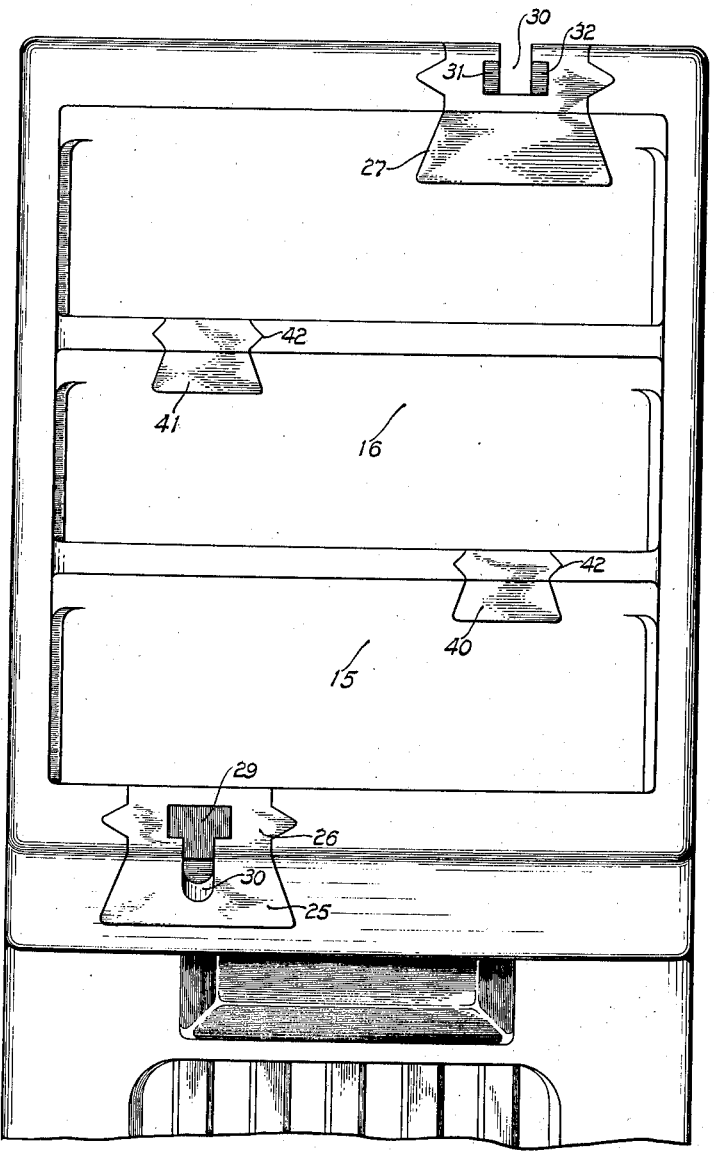
Figure 5 is an end perspective view of a battery case showing the intercell and terminal connectors in the wall of the case.
Figure 6:
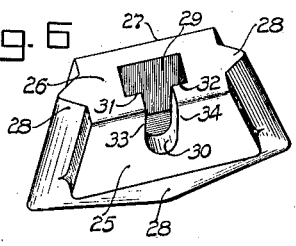
Figure 6 is a perspective view of a preferred form of terminal connector per se.
Figure 7:
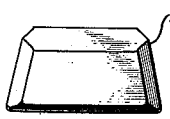
Figure 7 is a perspective view of a preferred form of an intercell connector per se.

The single embodiment of the invention, as illustrated in Figures 1, 2, 3 and 5, includes a battery case 10 of any preferred shape or size having side walls 11 and 12, end walls 13 and 14; and transverse interior walls 15 and 16, forming individual cell compartments 17, 18 and 19, but it is to be understood that a greater or lesser number of walls, or a different arrangement of walls for forming the cells may be provided and still be within the scope of the present invention. The top of the battery case is closed by cell covers 20 and sealed with a sealing compound 21 poured in the crevices between the covers and the sides of the case. Each cell cover is also provided with a vent plug 22 for allowing escape of gases from the cell.

In the end walls 13 and 14 of the case, the novel terminal connectors of the present invention are shown at 23 and 24, in their relationship with the casing. These terminal connectors are made as an integral part of the case by molding them in place as inserts when the case is made. In the preferred embodiment, as illustrated in the drawings, they are of the same width as the wall of the case in which they are molded and have three sides 25, 26 and 27 exposed and flush with the inside, outside and top face of the wall. To prevent displacement of the connector in a horizontal plane, the sides of the connector in contact with the material of the wall have an irregular contour and preferably in the form of a rib 28 on three sides. The terminal connector inserts are also made wider at the bottom than at the top so that they cannot be moved in a vertical plane, which, together with the irregular contour of the faces in contact with the material of the wall, locks the connector in its molded position and prevents removal or displacement without breakage of the molded wall.

These terminal connectors are also provided with means on one of the exposed faces for connection with a bus bar or cable of an external circuit, and in the preferred embodiment are of a novel slotted construction. In this form, the connector has a central recess 29 of rectangular contour in one of the faces, and a slot 30 in another of the faces at right angles to the recessed face and extending into the recess 29 and forming internal shoulders 31 and 32 and opposed external shoulders 33 and 34, on opposite sides of the slot 30. A bolt 35 is provided for cooperation with the connector having a head 36 adapted to fit freely in the rectangular recess and a threaded shank 37, extending outwardly through the slot 30 so that a nut 38 may be screwed on to the threaded shank until it engages the shoulders 33 and 34 and draws the head of the bolt against the shoulders 31 and 32 to tightly clamp the bolt in place. A cable or bus bar terminal 39 is placed between the nut and the shoulders 33 and 34 and pressed into electrical contacting relation with the exposed face of the connector. With this construction, the entire stress of the clamping bolt 35 is within the connector itself and will not tend to withdraw the connector from the wall of the case. Preferably, the recess 29 is in the top face 26 and the slot 30 in the outside face 25, so that the connection with the cable 39 is made on the outside of the casing wall, but the arrangement of recess and slot may be reversed so that the connection will be made on the top of the wall, if desired. These terminal connectors are positioned remotely with respect to the vent plugs of the adjacent cells and, as illustrated, are on opposite sides of a center line in the two respective end walls of the casing.

Intercell connectors 40 and 41 of novel construction are also molded integrally in the transverse walls 15 and 16 of the case. These intercell connectors are also of a wedge-shaped contour, being wider at the bottom than at the top, and having an irregular contour on the faces engaging the material of the case. Preferably, this irregular contour is in the form of an extending rib 42 on three sides of the connector. These intercell connectors, like the terminal connectors, have parallel side faces of trapezoidal contour with the ribs extending outwardly from three edges between the parallel faces. The intercell connectors are also preferably molded in the transverse walls 15 and 16 so that they have three exposed faces flush with the sides and top of the wall in which they are positioned.

The intercell connectors 40 and 41, together with the inside exposed faces 27 of the terminal connectors, complete the internal circuit of the battery, and to this end, are preferably made of lead or other material that may be united with lead as by burning, soldering or welding so that they may be connected with the upwardly extending lugs 44 of plate straps 46 and 47. The plate straps 46 and 47 are of usual construction in that they have a body portion 48 from which the lugs 44 extend and with the edge slotted as at 49 for receiving and spacing the plate lugs to which they are connected by burning. In each cell there are two plate straps connected, respectively, to the alternate positive and negative plates shown generally at 50, and the straps are reversed with respect to each other so that the lugs 44 will extend to a position closely adjacent the opposite end walls of the cell and on either side of a center line of the cell, where the intercell and terminal connectors are positioned in the case walls.

In assembling the battery, the groups of positive and negative plates are burned to the connector straps 46 and 47, respectively, before they are placed in the case, and then, together with the plate separators, are inserted in the cell compartments 17, 18 and 19, as separate units. The strap lugs 44 are so constructed that when the plate units are in position in the cells they will lie closely adjacent the exposed faces of the intercell connectors 40 and 41 in the transverse walls 15 and 16, and the exposed faces 27 of the terminal connectors. The lugs 44 of each cell are then united with the connectors in the opposite walls by a burning or soldering operation so that the positive plates in one cell are connected with the negative plates of the adjacent cell and so that the terminal connectors are positive and negative, respectively. The cell covers 20 are then placed on the open top of the cells and over the intercell connectors 40 and 41, and the sealing compound 21 is poured in the crevices between the cell covers and the walls. The bus bar or cables 51 and 52 of an external circuit are then connected to the terminal connectors by slipping the terminals 39 of these cables over the threaded shank 37 of the bolts 35 and then pressed tightly against the outside exposed faces 25 by means of the nut 38 when screwed on to the shank.

With this construction, it will be seen that a novel battery case is provided having intercell and terminal connectors formed integrally therewith and providing a battery in which there are no connections extending above the top surface of the battery. It will also be apparent that the corrosion and danger of short circuit or leakage will be materially reduced due to the external connections on the outside of the case and the remote location of the terminal connectors with respect to the vent plugs.

Having now described the invention, it will be apparent to those skilled in the art that other constructions and modifications may be made and still be within the scope of this invention. For instance, the irregular contour of the surfaces in contact with the material of the case need not be in the form of a rib, nor the outline of the connector inserts of trapezoidal contour, as dowels or pins formed integrally with the inserts would also perform the function of the ribs and the wedge shape of the insert. The connection recesses need not be of the exact shape described and in place of such means of connection, other clamping or binding elements may be used; and reference should be had to the claims for a definition of the scope of the invention.

What is claimed is:

1. In a battery case, a terminal connector molded in the wall of the case having two faces exposed and flush with the top and outside surface of the wall, the two exposed faces of the connector being recessed to form a clamping seat for an external circuit connection.

2. In a battery case, a terminal connector molded in the wall of the case with three sides exposed and flush with the sides and top of the wall and having projections extending into the material of the wall for preventing displacement of the connector with respect to the wall in any direction, said top face having a rectangular recess and said outside face having a slot extending into the rectangular recess to form a clamping seat for an external circuit connection on the outside of the battery case.

3. In combination with a battery case, a terminal connector comprising a metallic element having a recess formed in one face thereof and a slot formed in another face thereof, said recess and said slot forming opposed internal and external shoulders, a bolt adapted to fit in the recess and extending out through the slot, and a nut for clamping the bolt between the internal and external shoulders.

4. In combination with a battery case, a terminal connector molded in the wall of the case with three exposed faces flush with the top and side walls of the case, said connector comprising a metallic element having its top face recessed and its outside face slotted and joining the recess to form opposed internal and external shoulders, a bolt having a head adapted to fit into the recess and a threaded shank extending to the outside of the case through the slot, and a nut for clamping the bolt between the internal and external shoulders.

GEORGE L. KYLE.